July 4, 1933.  J. BIJUR  1,916,251
LUBRICATION
Original Filed Nov. 5, 1923  5 Sheets-Sheet 1

INVENTOR
Joseph Bijur
BY Dean, Fairbank, Obright & Hirsch
his ATTORNEYS

July 4, 1933.   J. BIJUR   1,916,251
LUBRICATION
Original Filed Nov. 5, 1923   5 Sheets-Sheet 3

INVENTOR
Joseph Bijur
BY
his ATTORNEYS

July 4, 1933.  J. BIJUR  1,916,251

LUBRICATION

Original Filed Nov. 5, 1923   5 Sheets-Sheet 5

INVENTOR
Joseph Bijur
BY
his ATTORNEYS

Patented July 4, 1933

1,916,251

UNITED STATES PATENT OFFICE

JOSEPH BIJUR, OF NEW YORK, N. Y., ASSIGNOR, BY MESNE ASSIGNMENTS, TO AUTO RESEARCH CORPORATION, A CORPORATION OF DELAWARE

LUBRICATION

Application filed November 5, 1923, Serial No. 672,870. Renewed September 16, 1930.

The present invention relates to lubrication and particularly to central lubrication where the bearings on a relatively moving structure are supplied with lubricant from a central source on another structure.

The present invention is more especially concerned with the lubrication of the bearing or wearing surfaces associated with the front wheel knuckle, including some or all of the following: the king pin bearings, the tie rod and drag link bearings, the wear surface of the brake cam and the various bearings or parts of the brake operating shaft.

The invention in a preferred application is concerned with the lubrication of the elements referred to, designated generically the "front wheel control appurtenances" and if desired, also the front wheel spindle, by operation from the chassis, and in one aspect is concerned more especially with the construction and arrangement of conduit, by which the lubricant is passed to the knuckle.

The knuckle supply conduit, it is apparent, should accommodate the pivotal or steering movement of the knuckle relative to the axle, and its rise and fall relative to the frame, which occurs as the springs flex during travel of the vehicle. My invention has among its objects to provide a serviceable conduit of low cost, which is easy to install on any of a wide variety of vehicles, which provides the required yield or flexibility where yield should occur, which is not subject to whipping, which remains tight even for relatively high lubricant pressure and which is substantially proof against rupture or leak from vibration of the moving vehicle even in hard usage. My invention provides a conduit in the above relation, the parts of which are not likely to be bent or broken off by the usual impacts encountered in ordinary usage, and which, while accommodating the various relative movements without undue strain at any part of the conduit, is, nevertheless, mechanically so strong and is retained in place upon the vehicle structure so securely as not to be torn loose by the driving of the vehicle through brush or bushes, which will suffer no substantial injury from pelting by ice or loose stones that may be thrown up from the road by the movement of the vehicle thereon, which will not be torn off or damaged by mud frozen thereonto, and which will not be disturbed by handling as by removing mud in cleaning the vehicle.

In a preferred embodiment, the lubricant conduit bridges from the chassis frame independently of the axle, transversely across to the knuckle, in a substantially non-sagging line, sufficiently rigid to prevent whipping or flapping, yet with enough yield to accommodate the relative bodily displacement between the knuckle and the chassis in running operation. The conduit outlet and the knuckle inlet form a swiveling joint with respect to each other, which may be a ball and socket universal joint disposed axially of the king pin to permit the swiveling operation of the knuckle for steering and to avoid tension of the transverse or bridging conduit upon the knuckle inlet in the relative bodily displacement between the knuckle and the chassis frame. The transverse conduit of the degree of rigidity or yield specified may be provided by forming the chassis end of an otherwise rigid connecting pipe into a metal helix or by providing a spring protected flexible hose in lieu of such helix portion.

In another embodiment universal joints preferably of the ball and socket type are provided both at the inlet or chassis end and at the knuckle pivot end of the bridging conduit, the latter comprising telescoping pipe or rod elements providing a sliding connection to accommodate the displacement of the knuckle relative to the frame in operation.

In both embodiments, it is preferred to have a substantial length of conduit rigid with the ball or universal joint or joints, in order to provide considerable leverage, functioning in operation of the vehicle to automatically loosen the joint, should it be stiff from setting up tight, or from corrosion, or due to the entry of sand or mud.

In a construction of the type in which the front brake operating shaft extends transversely from the chassis frame to the knuckle above the king pin, I may employ said shaft as the conduit for conveying the lubricant from the chassis frame to the various brake bearings and to the knuckle. For this purpose, the brake operating shaft may be provided with a boot or shell mounted on the knuckle and enclosing the universal joint at the knuckle end of the operating shaft, the boot or shell thus substantially directly above the king pin. Oil delivered through the brake operating shaft is collected in the shell from which the bearings are lubricated by gravity flow through conduits tapping said shell.

The invention from another aspect is concerned with the local distribution of lubricant from the knuckle inlet to the various bearings associated with the knuckle.

The invention is shown embodied in the steering knuckle of a motor vehicle and provides convenient means for reliably supplying with clean oil all or any number of the bearings carried by or associated with said knuckle and without the need for selective manipulations or direct manual access to the individual bearings, and without the use of any protruding or projecting conduits likely to be torn loose in ordinary use of the vehicle.

The knuckle inlet and the various control bearings are all substantially unitary with the knuckle, and preferably rigid seamless metal connecting pipe, extends along structural parts of the knuckle from the inlet to the bearings. In the embodiments shown the bearings are supplied in parallel from the knuckle inlet, which serves as the distributer and has flow control appurtenances to assure correct division.

The knuckle inlet may be disposed in convenient location immediately above the king pin to supply lubricant by gravity flow to the various bearings, which are at lower level.

In the drawings:

Fig. 14 is a diagrammatic view on a smaller scale generally similar to Fig. 1 illustrating another bridging run arrangement, Fig. 14a is a sectional detail of the yielding chassis connection shown in Fig. 14, Fig. 15 is a fragmentary sectional view on an enlarged scale of the lubricant feeding connection between the conduit and the knuckle, Figs. 16 and 17 are sectional views taken along the lines 16—16 and 17—17 of Fig. 15, Fig. 18 is a view similar to Fig. 15 of a modification, and, Fig. 19 is a sectional view taken along the line 19—19 of Fig. 18.

Figures 1, 1A, 2, 3, 4:
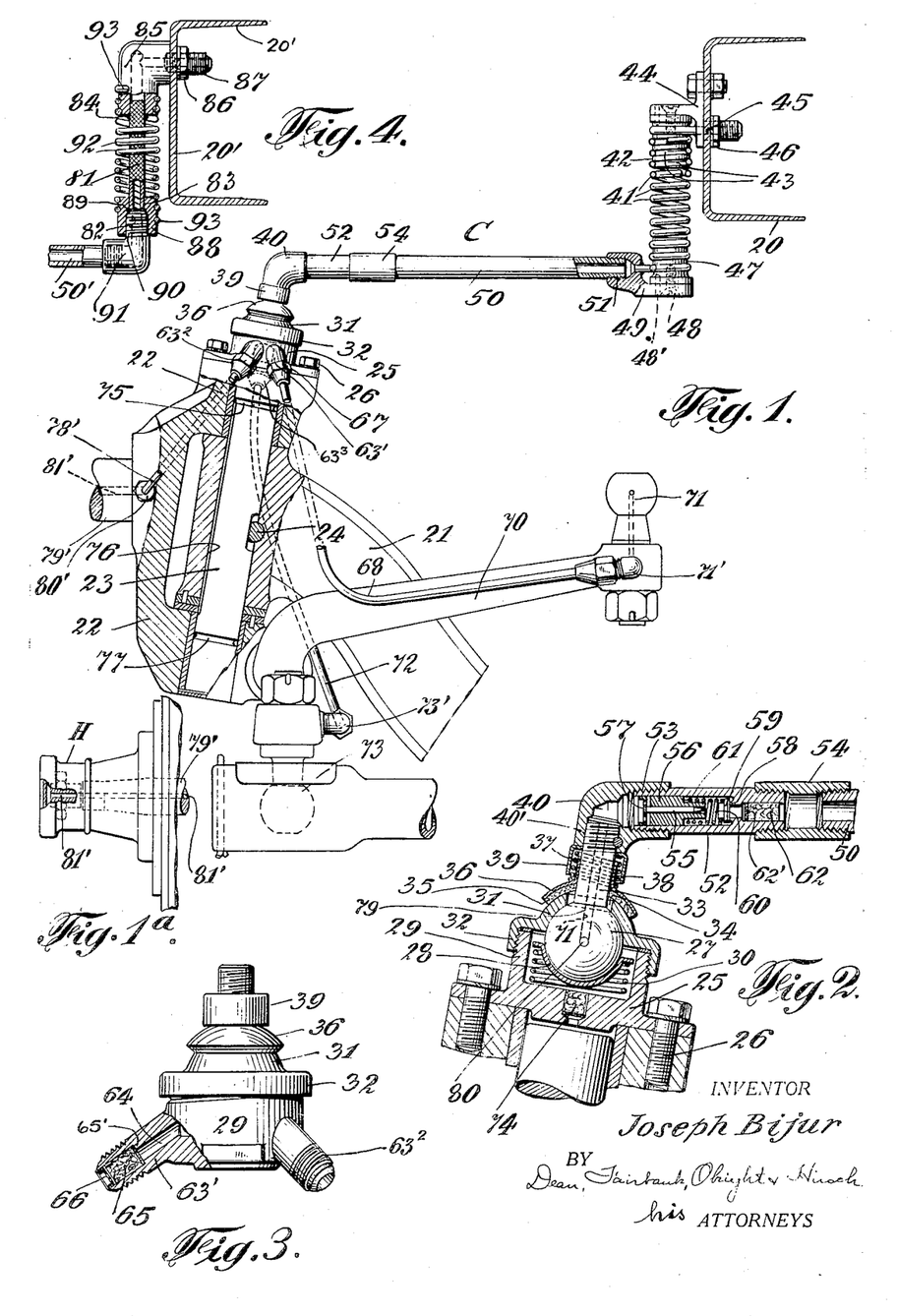
Fig. 1 is a side elevation partly in section, indicating an embodiment for passing lubricant from the chassis to the knuckle bearings.
Fig. 1a is a view complementary to Fig. 1 of the spindle end thereof.
Fig. 2 is a detail fragmentary view in longitudinal section on a larger scale.
Fig. 3 is a sectional view partly in elevation of the distributor cup and associated parts.
Fig. 4 is a fragmentary view of an embodiment of yielding element alternative to that shown in Fig. 1.

In Figs. 1, 2 and 3 is shown a conduit arrangement for supplying lubricant for bearings associated with the front wheel knuckle through a transverse bridging course from the contiguous channel frame. The drawings indicate a cross-section of the chassis frame at 20, and a knuckle with a clevis 22 straddles the end of the front axle 21, said knuckle mounted by means of a king pin 23, which is pinned at 24 to the end of the axle. In the embodiment shown, a knuckle inlet or distributor fitting 25 formed with a cup 29 is secured by means of screws 26 to the top of the knuckle immediately above the king pin. The bridging conduit C has a ball outlet 27 fitted betwen a sheet metal generally hemispherical socket member 28 within the cup 29 and pressed upward by a light coil spring 30 into engagement with ball 27 to urge the latter into bearing contact with a hemispherical socket cap piece 31 threaded as at 32 upon the cup 29. The shank 33 of the ball 27 protrudes above the top of the cap through an opening 34. A gasket 35 snugly embraces the shank to prevent entry of dust at opening 34 and is pressed against the socket cap by a coil spring 37 which acts through a sheet metal gasket holder 36. The spring 37 encircles the tubular extension 38 of the holder 36 and reacts against the end of a protective cap 39 around the spring. The protective cap 39 is clamped in place by an elbow connecting fitting 40 threaded as at 40' to the shank 33 of the ball.

The bridging conduit C includes in the embodiment shown, a length of seamless metal pipe curved into a helix 41 which is secured at its upper end by screwing the upper convolutions thereof over a stud 42 having a corresponding thread formation 43, said stud secured to a bracket 44, which, in turn, is bolted to the channel frame 20. The inlet end 45 of the helix extends through the channel frame and is connected to an inlet nipple 46, which is supplied from a source of lubricant (not shown) on the chassis frame. A stud 47 similar to stud 42 is threaded into the lowermost convolutions of the helix 41 and has secured thereto as by a screw 48 and a dowel 48', a special connecting fitting 49 to which the lower end of the helix 41 delivers lubricant for passage through a straight connecting pipe 50 threaded as at 51 at one end into the fitting 49 and connected at the other end with the elbow fitting 40.

In the embodiment shown a straight-line drip plug is employed, preferably contiguous to the knuckle ball joint. This drip plug comprises a pipe length 52 directly threaded as at 53 into the elbow fitting 40 and connected with the pipe 50 at its opposite end by a union 54. The drip plug is similar to those described in my copending applications, and may comprise a restriction pin 55 fitting with small clearance, in the order of .004" within a longitudinal bore of about 1/16" in diameter, in a plug 56, which is firmly fixed into the casing tube 52, the pin being held against egress by a friction-fitted cap 57. The casing 52 also has an integral valve seat 58 against which a relief valve 59 is pressed by a coil spring 60, which reacts against shoulder 61 on plug 56. The usual advance strainer plug 62 of felt is provided in the drip plug in advance of the valve 59 to intercept any solid particles that may be carried with the lubricant, and is provided with a wire gauze end cap 62' to support the felt against the pressure of the lubricant.

The distributor cup 29 is provided, as shown best in Figs. 1 and 3, with three nipples 63', 63² and 63³ extending obliquely downward therefrom, each said nipple provided with a damming plug 65 therein, illustratively shown in this embodiment as a wad of felt maintained in place therein by a perforated friction-fitted cap 66, and retained by a gauze backing 65' against being pushed into the small hole 64. The outlet nipple 63' is connected by a union 67 with a pipe 68, which extends downward along the knuckle and along the steering rod arm 70, to which it may be clamped; to the bearing 71 at the end thereof, to which it delivers through fitting 71'. Nipple 63³ is similarly connected by pipe 72 to the tie rod bearing 73, to which it delivers through fitting 73'. Nipple 63² is connected by a pipe 78' to supply lubricant to the wheel bearing spindle 79' through fitting 80'. The spindle 79' has an axial bore 81' through which the lubricant is delivered to replenish the supply in the hub cap H. It will be understood that oil may be thus delivered to the wheel bearing to maintain the desired fluidity of the usual grease, or if desired, the oil lubrication may be thus provided instead of grease.

Since the knuckle inlet or distributor 25 is mounted rigidly upon the knuckle to rotate therewith, as are also the tie rod, steering arm and front wheel spindle bearings, the connecting conductors 68, 72 and 78' are rigidly fixed to the knuckle and can be and preferably are of rigid seamless metal pipe.

The base of the distributor 25 is preferably provided with an axial damming plug 74 past which lubricant will flow downward to the king pin 23 immediately therebelow. Lubricant will be intercepted by peripheral groove 75 about the king pin, the excess therebeyond passing downward through longitudinal groove 76 in the king pin to be intercepted in a similar peripheral groove 77 at the lower bearing. The lubricant spreads readily from grooves 75 and 77 to maintain the corresponding king pin bearing surfaces oiled.

In operation, lubricant forced through inlet nipple 46 will be transmitted through the length of helical conduit 41 and connecting pipe 50, to force open the valve 59, the lubricant being forced therebeyond past the minute crevice determined by the restriction pin 55 and passing onward through the elbow fitting 40 and the axial bore 79 through the ball shank and emerging from radial bores 80 through the ball 27 and thus lubricating the ball and socket joint. Lubricant from the ball passes about the socket shell 28 into the collecting or distributor cup 29 therebelow, and since this element is well above the bearings, the latter are oiled by gravity flow. Damming plugs 65 in the nipples and draining plug 74 control the division of the lubricant from the knuckle inlet in parallel distribution between the tie rod, the steering arm, the front wheel spindle and the king pin bearings respectively.

It will be seen that the ascent and descent of the axle relative to the chassis frame as the vehicle springs are flexed in operation, is accommodated by flexure of the helix coil 41, which may thereby be curved laterally toward or from the channel frame 20, the ball 27 in that operation performing a rotary displacement within its socket about a horizontal axis at right angles to the plane of the view. The slight rearward movement of the axle as the springs deflect is also accommodated by a corresponding slight rotary movement of the ball 27. The universal ball and socket joint at the outlet end of the bridging conduit being co-axial with the king pin 23, the pivotal steering movement of the knuckle takes place without strain on the bridging conduit, the cup member of the distributer 25 rotating as a unit with the knuckle about the non-rotating ball 27 at the outlet end of the bridging conduit. It is apparent that the pivotal steering movement of the knuckle can take place concurrently with the movement of the knuckle or axle as a whole relative to the chassis frame, while the vehicle springs flex in operation, the ball and socket joint readily performing the compound rotations to freely accommodate the combined pivotal steering and translational displacements of the knuckle, while the helix 41 flexes as heretofore described, to accommodate the small changes in the distance between the channel frame and the ball, as the latter rises relative to the former. It will be seen that the pressure from the centralized source in the present embodiment is carried through a pressure-tight pipe from the channel frame through the length of the helix and the connecting pipe to the drip plug pin 55 and would, therefore, be reliably transmitted to the king pin, regardless whether the outlet or knuckle end of the bridging conduit is lower or higher than the inlet end of the chassis.

The present embodiment provides a particularly simple, direct, short and effective lubricant conduit connection from the channel frame to the knuckle. The transverse pipe 50 is rigid and the spring-like helical element 41 has sufficient stiffness both to prevent appreciable sagging of the conduit under the weight of pipe sustained therefrom and to avoid whipping or lashing of the bridging conduit in use of the vehicle. Thus, the bridging conduit without auxiliary support to sustain it between its mount 44 on the channel frame and its ball and socket mount on the knuckle, extends freely between the channel frame and the knuckle, in a self-sustaining substantially non-sagging, non-leaking line, but with sufficient yield for the purposes set forth. The conduit, moreover, has sufficient ruggedness to withstand pelting with particles of ice or small stones thrown up from the road in traveling and is, moreover, applied to the vehicle so securely as not to be torn loose by driving the vehicle through brush or bushes. The axle 21 extending directly below conduit 50, moreover, acts as a guard to shield the latter against impact. Furthermore, the conduit is substantially proof against the entry of dust or dirt to the lubricant conveyed thereby.

It will be seen that the bridging conduit is applied with the utmost facility, the knuckle inlet or distributer fitting 25 being merely secured with respect to the knuckle by screws 26 and the bracket 44 by bolts at the channel frame, the conduit bridging therebetween in the manner shown. My direct bridging conduit is thus more easily applied than is a conduit, which extends from the chassis continuously along structural parts of the vehicle to the knuckle and is, moreover, not associated with parts such as the vehicle springs, which may be subject to replacement or repair from time to time.

A substantial length of conduit is provided by my invention rigid with the ball outlet 27. Thus, in operation of the vehicle, any force upon the chassis end of the pipe 50 due to vibration of the chassis, would be transmitted to the ball with substantial torque-multiplying leverage to provide a substantial force at the ball, to positively release the latter should it become jammed in its socket as by a particle of sand or dirt. The ball and socket joint may thus be spring-loaded as shown, to be relatively stiff, thereby preventing any rattle or looseness in operation, and yet yielding in the desired manner, in operation.

In Fig. 4 is shown a modification of the yielding construction at the chassis frame end of the bridging conduit, the parts not shown being identical with the disclosure of Fig. 1. In this case, I have shown as the yielding conduit, a short length of flexible hose or pipe 81. This may be the familiar tubing known commercially as "Titeflex" and embodying a metal strip 82 wound and crimped helically into a closed pipe and encased in a braided wire sheath 83. The flexible conduit 81 is soldered as at 84 into the outlet bore of an elbow-shaped fitting 85 secured by a lock nut 86 to the channel frame 20' and provided with an inlet nipple 87. The lower or delivery end of the flexible hose extends through the axial bore of a stud 88 to which it is soldered as at 89. Nipple 90 of an elbow fitting 91 threaded into stud 88 delivers to the pipe 50' which corresponds to pipe 50 in Fig. 1. A coil spring 92 encircles hose 81 with its end convolutions threaded into corresponding helical grooves in the lower or stud end of elbow fitting 85 and in stud 88, the ends of said spring extending radially into said fittings as at 93 to maintain the security of the assembly. The spring 92 is under compression to maintain the flexible hose 81 extended, and is sufficiently rigid to prevent the chassis end of the tube 50' from jumping up in operation of the vehicle. The spring 92 serves also to protect the hose 80.

Figures 5, 6, 8A:
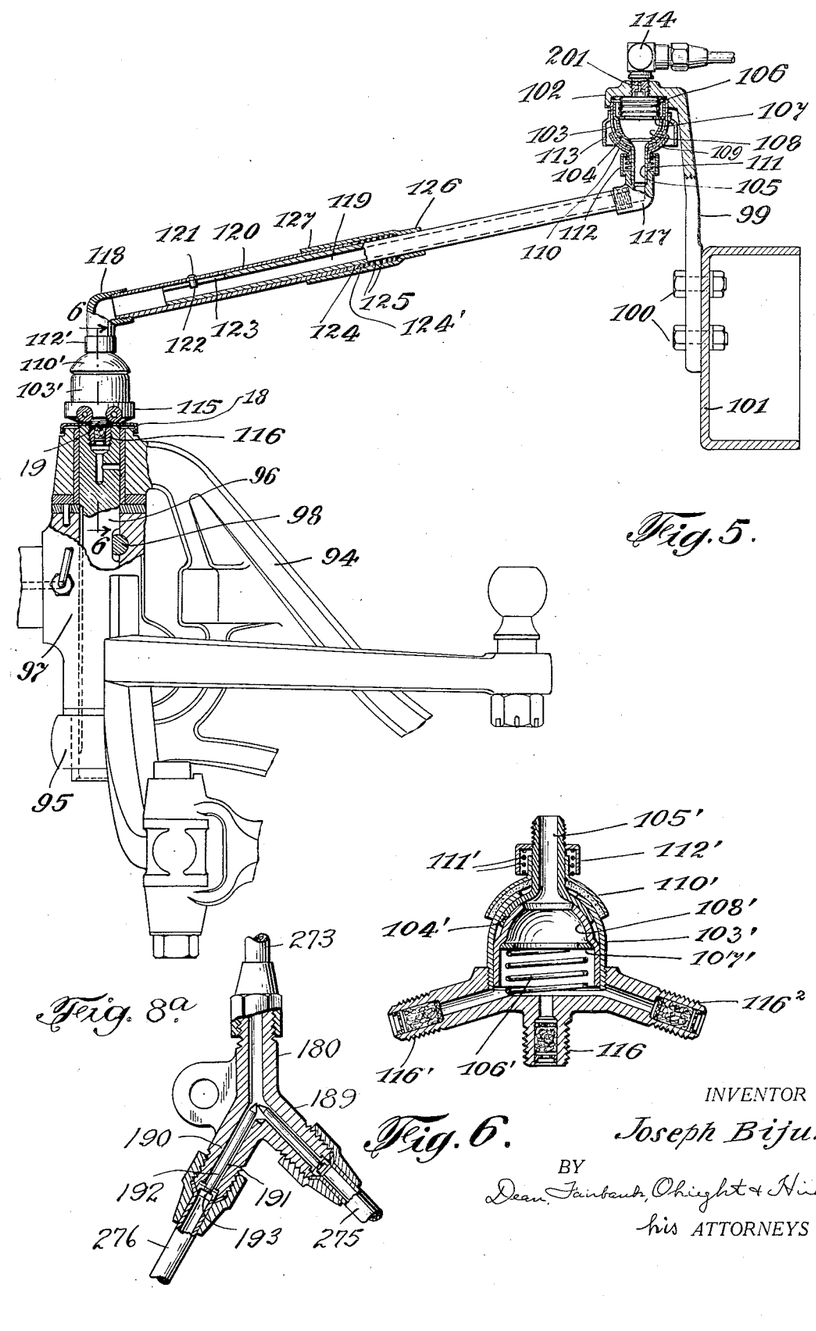
Fig. 5 is a view similar to Fig. 1 of a further embodiment.
Fig. 6 is a detail sectional view taken along the line 6—6 of Fig. 5.
Fig. 8a is a view on an enlarged scale in longitudinal cross section illustrating the details of the dividing fitting 180 of Fig. 8.

In Figs. 5 and 6 is shown a modified embodiment for bridging freely and transversely from the channel frame to the contiguous knuckle to supply lubricant to the latter. The present embodiment is shown illustratively applied to a knuckle of the "Elliot" type, in which the axle 94 is provided with clevis jaws 95 and the king pivot pin 96 for the knuckle 97 is locked to the latter as at 98 to rotate therewith in the bearings provided in the clevis jaws of the axle. In this embodiment, I have provided universal joints at both the chassis and the knuckle ends of the conduit and have connected the said universal joints with a conduit pipe, formed of two rigid telescoping parts, so that while straight and non-sagging, said conduit may distend and contract to accommodate the relative displacement of the knuckle and the chassis frame in operation of the vehicle.

In the detailed construction, and referring to Fig. 6 which shows on a larger scale, with corresponding reference numerals primed, a construction substantially identical with that at the chassis end, a bracket 99 is bolted as at 100 to the channel frame 101 and provided with a downwardly extending flange 102 into which is threaded a stamped metal socket element 103, which serves as a bearing for the spherically flared ball end 104 of a hollow shank 105 protruding therebelow. A coil spring 106 within the socket 103, acts through a washer 107 to press a cup 108 disposed within socket 103 against the ball flare 104 and the latter against the stationary socket support 103. A gasket 109 with a sheet metal holder 110 encircles the shank 105, a coil spring 111 about the shank protected within a cap 112, pressing the gasket into effective dust-proof relation with the ball and socket joint. A skirt 113 is friction-fitted about the exterior of the socket 103 to protect it from dirt or dust, which might otherwise drop thereonto, and possibly work its way to the bearing surface.

The joint described, constitutes, in effect, a light and inexpensive universal ball and socket joint, entirely of stampings, which serves as an inlet for lubricant to be passed to the knuckle, for instance, from an inlet fitting 114 in bracket 99.

The ball and socket joint at the outlet or knuckle end, is substantially identical in construction with that just described, substantially the only difference being that the skirt 113 may be omitted, since the edge of the gasket slopes downward, and dirt will readily drop therefrom. Parts of the ball and socket joint at the knuckle corresponding to those at the chassis bear the same reference numerals, primed however. The socket 103' is threaded as shown, into a knuckle inlet, comprising a distributer fitting or cup 115 provided with a central nipple 116 threaded directly into the top of the king pin 96. A dust cap 18 encircling nipple 116 is pressed by spring washer 19 against the top of the king pin, and has a flange 17 telescoped on the upper end of the axle clevis. The distributer fitting has lateral nipples 116', 116² and 116³, similar to those shown in Figs. 2 and 3, for connection respectively to the tie rod, the steering arm and the wheel spindle bearings, by conduits (not shown) similar to those in Fig. 1.

The connecting conduit between the universal joints comprises an elbow fitting 117 threaded to the unflared end of shank 105, a generally similar elbow fitting 118 threaded to the inlet or unflared end of shank 105' at the knuckle and a connecting pipe comprising a tube 119 threaded into the elbow fitting 117 and telescoped into a similar tube 120, which is, in turn, threaded into fitting 118. A rivet 121 through the outer tube has a stud 122 riding in a corresponding longitudinal slot 123 within the inner tube to permit the limited telescoping movement required, and to securely maintain the shank of fitting 118 in the erect position shown in the drawings, from which position, it might otherwise shift in vibration, by rotary displacement of flared element 104'. To prevent the entry of dust or dirt through the otherwise exposed telescoping surface of the connecting pipe, I provide a gasket 124 about the inner tube adjacent the free edge of the outer tube, said gasket held in tight relation by a beveled metal washer 124' against which presses a coil spring 125 reacting against the fastening collar 126 of a sleeve 127 secured to the tube 119 and snugly fitted over the end of tube 120 and enclosing the gasket 124, the washer 124' and the spring 125.

In operation of the vehicle, the steering movement of the knuckle takes place by rotation of the ball socket at the knuckle end about the flared end 104' of the shank 105'. The ascent and descent of the knuckle relative to the chassis in operating over a rough road, for instance, is freely accommodated without strain on the bridging conduit by the rocking of the ball and socket joints at the chassis frame and knuckle ends, the telescoping movement of the intervening tubes 119 and 120 accommodating the small changes in distance incurred in operation between the universal joints.

The inlet fitting 114 may be an oil cup to be replenished from time to time in the usual manner. In the drawing, I have, however, indicated a fitting which delivers lubricant at a measured rate when pressure is applied thereto. The preferred form of fitting is one which I designate a "drip plug", which includes a highly restricted outlet 201 through which lubricant is forced slowly under pressure that may be applied concurrently at a plurality of such fittings from a central source of pressure. As the details of this construction and arrangement are not part of my present invention, they need not be here further set forth. Upon application of pressure, the drip plug discharges into socket 108 from which the lubricant flows by gravity through conduit 119—120 and into the knuckle inlet 115 and from the latter to the knuckle bearings through pipes (not shown) similar to those in the embodiment of Fig. 1. The transverse conduit 119—120 bridges freely in a substantially non-sagging line between the two universal joints, and will not whip or lash in operation. This conduit also, as those in Figs. 1 to 3, has sufficient mechanical strength to withstand any pelting to which it may be subjected in normal use of the vehicle and is, moreover, protected by axle 94 directly therebelow.

It is, of course, understood that the inexpensive stamped metal ball and socket construction shown in Fig. 5 could be substituted in lieu of the solid ball shown in Fig. 1.

It will also be understood that in Figs. 1 and 4, the drip plug may be eliminated at the knuckle end of the bridging line, and a drip plug or other inlet substituted therefor as in Fig. 5.

The knuckles at the right being devoid of the steering arm, the lubricating arrangement therefor would lack the steering arm outlet and pipe shown. Where the usual conventional grease lubrication of the wheel spindle is desired, the arrangements shown and described for supplying oil thereto would, of course, be omitted.

Figure 7:
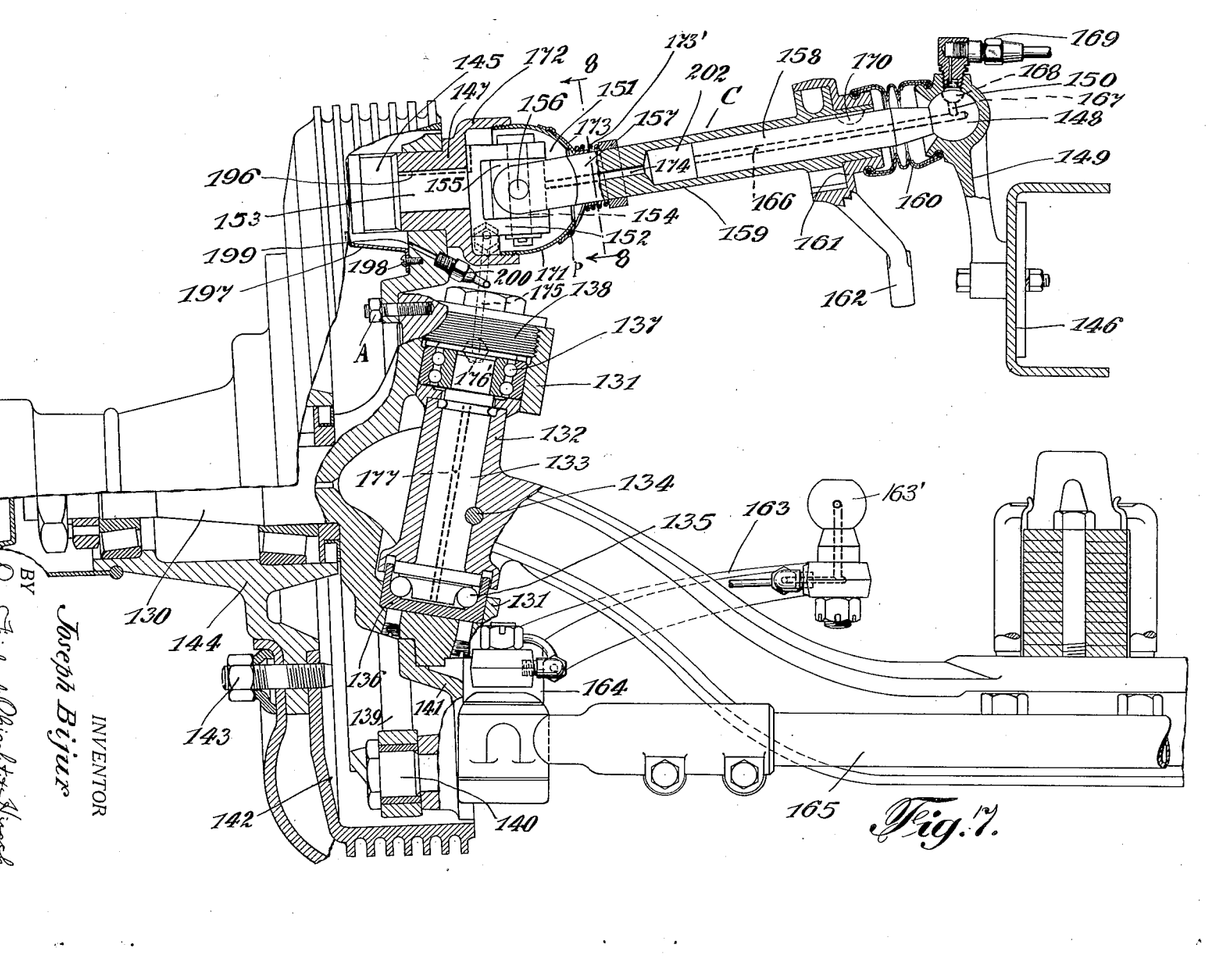
Fig. 7 is a view in longitudinal cross-section, indicating means for lubricating front wheel brake and other wheel or knuckle control bearings.
Figures 8, 9, 10, 11, 12, 13:
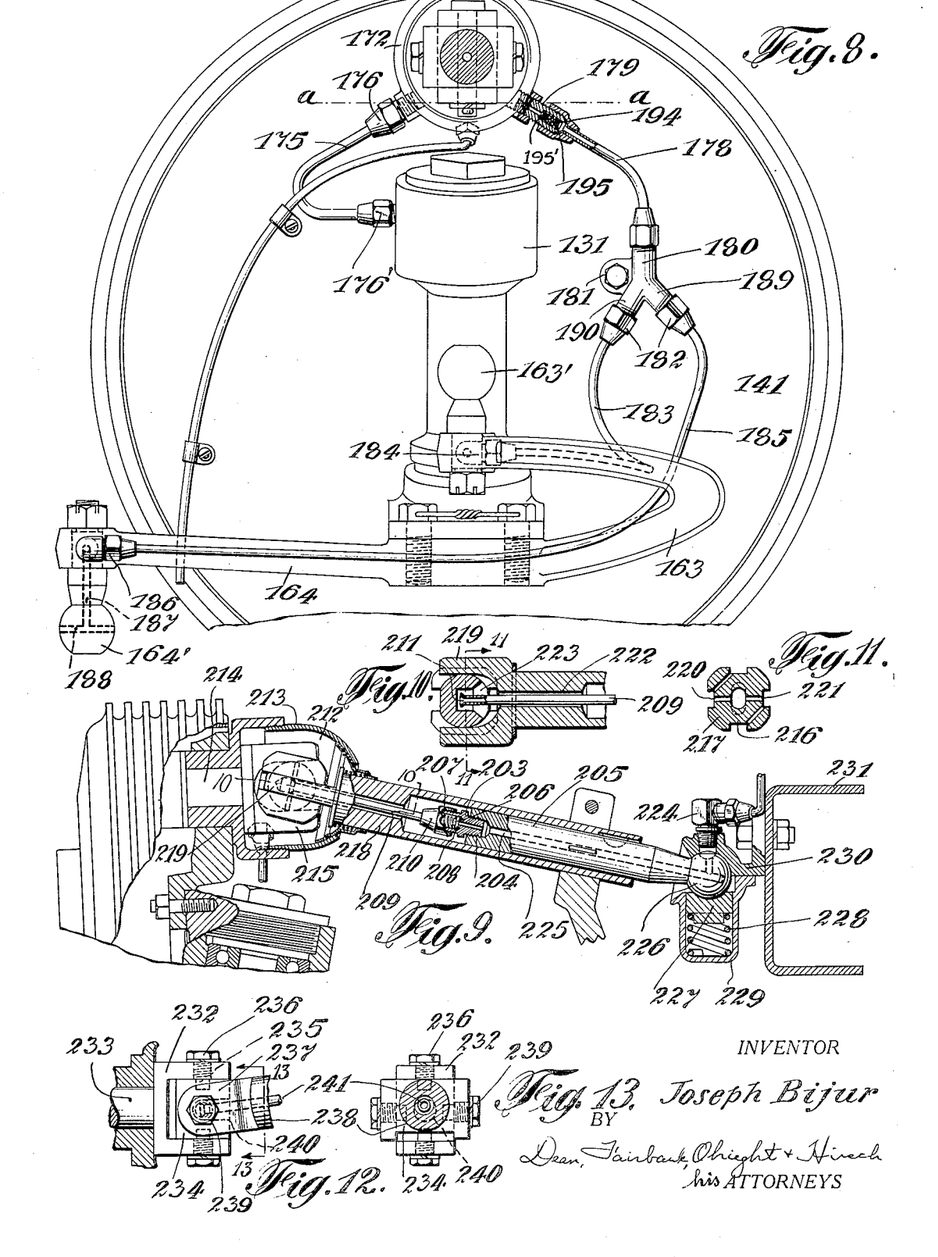
Fig. 8 is a sectional view taken along the line 8—8 of Fig. 7.
Fig. 9 is a fragment of a view generally similar to Fig. 7 showing a modification.
Fig. 10 is a detail sectional view taken along the line 10—10 of Fig. 9.
Fig. 11 is a detail sectional view taken along the line 11—11 of Fig. 10.
Fig. 12 is a fragmentary view of a modified form of universal joint for the knuckle end of the lubricant supply conduit.
Fig. 13 is a sectional view taken along the line 13—13 of Fig. 12.

In Figs. 7 and 8, I have shown a front wheel knuckle which includes a brake. The assembly as a whole is not my invention, apart from the lubricating arrangement therefor. The knuckle unit includes the bearing 130 for the front wheel and has a clevis 131 unitary therewith and straddling the end 132 of the front axle to which it is pivotally connected by the usual king pin 133 which is preferably pinned to the axle as at 134. A ball thrust bearing 135 at the lower end of the king pin rests within a cup 136 rigidly fixed in the lower jaw of the clevis, and supports the weight of the chassis. A ball bearing 137 encircles the king pin at the upper clevis jaw, which is closed by a screw plug 138.

The brake comprises an internal band 139 having two halves hinged at their lower ends to a stud 140 rigidly fixed in the brake shield 141. The brake shield is secured to the knuckle clevis by a plurality of studs as at "A" and the brake drum 142 is bolted at 143 to the wheel hub 144. The brake band is expanded against the brake drum 142 by means of a cam 145 coacting with the upper or free ends of the brake band halves and set and released by operation from the chassis frame. In the particular embodiment shown, the mechanical connection for operating the cam 145 from the chassis frame includes a cam shaft C bridging transversely of the vehicle, and having at the knuckle end bearing 147 within the brake shield 141. At the opposite or chassis frame end, the cam shaft is provided with a ball 148 lodged in a socket 150, which is upon a special bracket 149 clamped to the channel frame 146 and extending well thereabove. A universal joint 151 is provided substantially coaxial with the king pin, and comprises a clevis 152 rigid with the cam stud shaft 153. The pivot pin 154 through the clevis mounts the hub 155 to which is connected by means of studs 156, the clevis 157 at the outer end of the cam shaft C. To accommodate the limited approach and separation of the ends of the cam shaft relative to each other, in ascent and descent of the axle and knuckle relative to the frame in operation, the cam shaft is formed as shown of two telescoping parts, including a rod 158 integral with the ball 148 and a socket 159 telescoped thereover, integral with universal clevis 157. A flexible boot 160 is connected between bracket 149 and an operating collar 161 near the chassis end of the tube 159. Operation of the brake mechanism on the chassis, effects rotation of collar 161 through arm 162 and thereby turns cam shaft C and with it the universal 151 to operate the cam 145. The universal joints at the ends of the cam shaft and the telescoping relation of the parts thereof, serve to accommodate the various displacements of the knuckle relative to the channel frame. The universal 151 being substantially coaxial with the king pin, the pivotal or steering operation of the knuckle occurs without strain on shaft C. The left-hand knuckle shown, includes a steering arm 163 rigid therewith, co-acting with the usual steering gear (not shown) and a tie rod arm 164, by which steering action is transmitted through a tie rod 165 to the right-hand knuckle.

By my present invention, I have provided means now to be described for lubricating from a single source, bearings of the various control appurtenances associated with the knuckle. In this embodiment, the cam shaft itself serves as the conduit for conveying lubricant from the chassis to the knuckle. The cam shaft rod 159 is provided with a longitudinal bore 166 supplied from a radial bore 167 which drains a well 168 in the ball 148 within which the lubricant from the inlet fitting 169, illustratively a drip plug, is collected. The cam shaft rod is preferably keyed as at 170 with respect to the cam shaft socket 159, so as to prevent the free rotary displacement of the rod, the well 168 being thus maintained at all times in position to collect the discharge of the inlet fitting 169.

The universal joint 151 at the knuckle end is provided with a substantially oil-tight enclosing shell 171 comprising a generally spherical casing threaded into a flange 172 on the bearing 147 and provided with a cover 173 encircling the shaft 159 and sliding universally with respect to said shell in the relative displacement of the parts in operation. The cover 173 has packing $p$ to maintain the parts in dust-tight relation under the pressure exerted by coil spring 173' which presses the cover against the shell. The knuckle end of the cam shaft C has a longitudinal bore 174 through which the lubricant from rod 158 passes into the shell 171.

In the embodiment shown, a pipe 175 is connected by a fitting 176 at its upper end into the flange 172 of the universal joint housing at a point above the lowermost part thereof and at its lower end 176' into the upper of the knuckle clevises 131, so as to lubricate ball bearing 137 by gravity flow thereto from the shell 171. The king pin has a bore 177 through which lubricant passes from the ball bearing 137, to collect in cup 136 at the bottom, in order to lubricate the thrust bearing 135.

A second conduit supplies lubricant from the universal joint housing to the tie rod bearing 163' and the steering gear bearing 164'. This conduit comprises a short length of pipe 178 connected by a fitting 179 to the universal joint housing flange 172 above the bottom thereof at the side opposite pipe 175 and delivering to a dividing or Y fitting 180 which is secured at a lug 181 to the brake shield 141. The respective arms 189 and 190 of the Y fitting are connected as by union nuts 182 to a metal pipe 183 connected by fitting 184 to the tie rod bearing 163' and a second metal pipe 185 connected by fitting 186 to the tie rod arm bearing 164'. The lubricant passes to the bearing surface of each bearing stud 163'—164' through a longitudinal duct 187 communicating with radial duct 188.

Figures 14, 14A, 15, 16, 17, 18, 19:
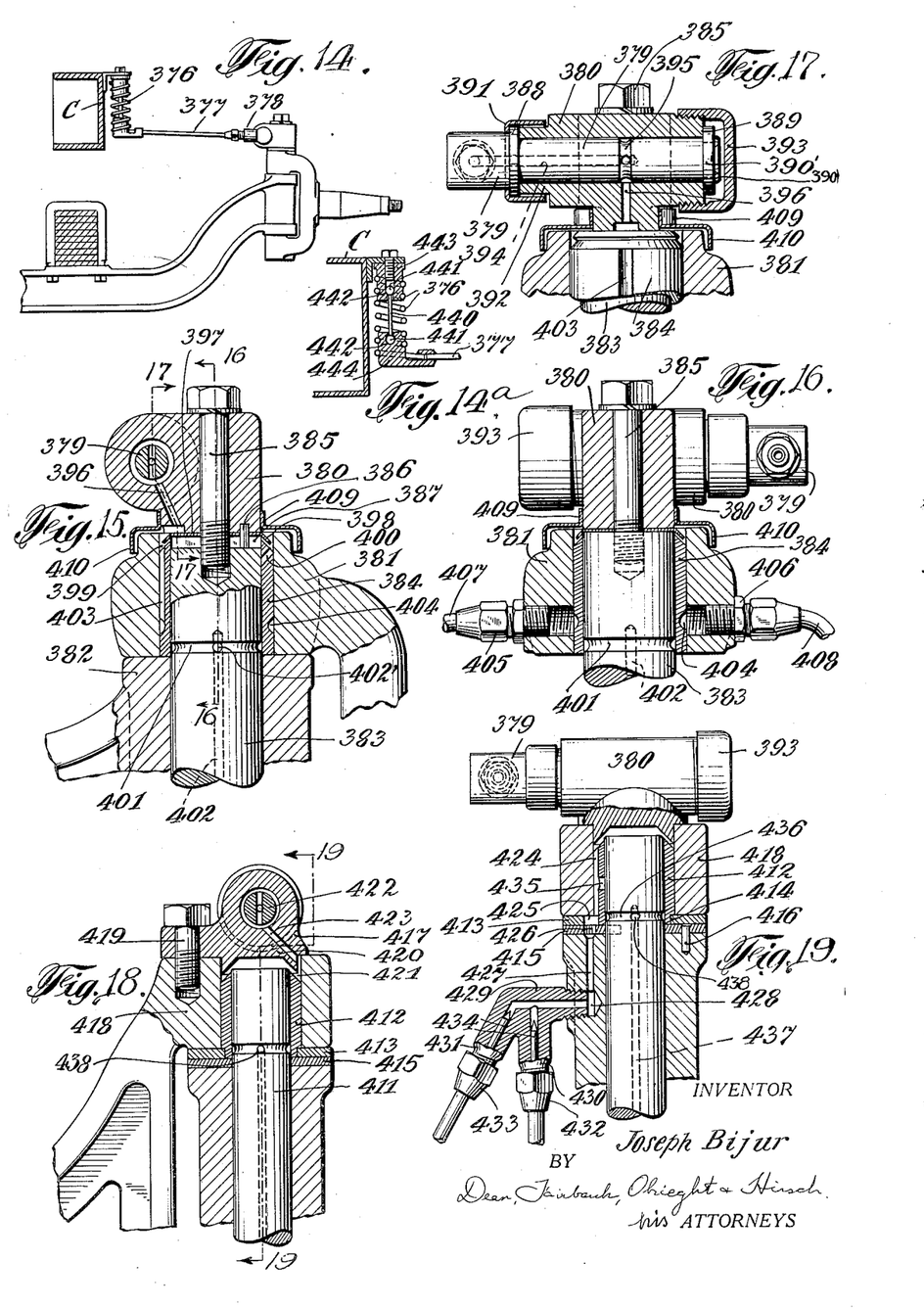

To assure proper division of the lubricant flowing by gravity from the universal housing shell 171 to the steering arm and tie rod bearings, the dividing fitting may be constructed as best shown in Fig. 17. The dividing outlets 189 and 190 have enlarged bores 191, within which are fitted pins 192 maintained in place therein by perforated friction-fitted caps 193. The pins are of diameter several thousands of an inch smaller than the corresponding bores, so that the lubricant will be sufficiently dammed in its gravity flow to the bearings to divide substantially equally.

To divide the flow accurately between pipe 175 and pipe 178, damming plugs 194, illustratively of felt, are provided in fittings 176 and 179. Each of the damming plugs is maintained within its fitting by a perforated metal friction cap 195 and is backed by a metal screen 195' for the same purpose as in the felt construction in Fig. 1. The felt damming plugs also serve to intercept any solid particles carried with the oil.

An oil groove 196 extends longitudinally from the universal joint housing 172 along the entire length of bearing 153 to supply lubricant to it as well as to the wear surface of the cam 145. A metal trough 197 is preferably secured as at 198 to the inner surface of the brake shield, to intercept any excess lubricant dripping from the cam, so that the efficacy of the brake bands will not be impaired by any eventual dripping of oil thereonto. The trough 197 is drained through a duct 199 which extends obliquely through the brake shield and delivers to an outlet fitting 200 which, in turn, may drip either upon the road or, if desired, may be connected in any convenient manner (not shown) to supply the steering arm and tie rod, or the king pin bearings.

In operation, lubricant passed from the channel frame flows by gravity through the cam shaft and collects at the bottom of the shell 171. The excess above the level indicated by line a—a in Fig. 8 drains in parallel by gravity flow through duct 175 to lubricate the king pin bearings and through duct 178 to lubricate the steering arm and tie rod bearings in the manner apparent from the previous description.

It will be observed that the ends of conduit 175 and of dividing conduit 178—183—185 constitute, in effect, rigid parts of the knuckle, moving as a unit therewith, so that the conduits require no flexibility and can, therefore, be and preferably are of seamless metal pipe which is not subject to leaks nor to rapid destruction or to flapping or whipping in operation. The entire length of the piping preferably extends as shown, along structural parts of the knuckle, that is, as best shown in Fig. 8 along the brake shield and along the lengths of the steering and tie rod arms.

The lubricant which is ordinarily at least at the level a—a in the universal joint housing, splashes freely therein as a result of the vibration in operation of the vehicle, thereby maintaining the universal joint pins 154 and 156 lubricated, while some of the splashed lubricant passes to groove 196 to lubricate bearing 153 and escapes therebeyond to oil the wear surface of the cam 145, any excess from the latter being intercepted by trough 197 and drained in the manner previously described. The lubricant from the chassis, it will be seen, not only lubricates the ball 148, but some portion thereof will be intercepted in the cavity 202 between the inner end of the cam shaft rod 158 and the base of the socket 159 therefor, for effective lubrication of the sliding joint between the two cam shaft elements.

Thus, it will be seen, that the lubricant after it has been forced from the drip plug 169, flows from the highest point in the knuckle system at the ball 148 by gravity to the shell 171, which constitutes the knuckle inlet and is a junction fitting or lubricant distributor, at which the lubricant is divided and from which it continues by gravity flow in parallel to the king pin, steering arm and tie rod bearings, the universal joint pins being lubricated by the splash, part of which drains to the bearing and wear surface of the brake. The length of the brake operating shaft including the boot 160, and the shell 171 constitutes a tight housing which prevents the entry of dust thereto, to the oil duct or to the bearings.

It may be noted here that in certain of the claims, the term "yielding" as applied to the chassis mount of the oil conveying conduit which bridges from the chassis to the knuckle is intended to apply generically to the ball and socket or other universal mount shown in Figs. 5 and 7, and to the helical or flexible mount shown in Figs. 1 and 3.

In Fig. 9 is shown a fragment of a modified form of the invention, particularly applicable in constructions generally of the type last described, in which the cam shaft slopes upward from the chassis frame to the knuckle as shown, rather than downward. The ball 226 at the inlet end of the cam shaft is sustained in this embodiment upon a ball cap 227 pressed by spring 228 within cap 229 against a complementary ball bracket 230 bolted directly to channel 231. The lubricant conduit through the cam shaft in this embodiment is modified with respect to that shown in Figs. 7 and 8, primarily in the provision of a check valve somewhere along the length of the cam shaft to prevent gravity return to the channel frame of lubricant that might be in the pipe. For this purpose, a special check valve fitting 203 is threaded as at 204 into the innermost end of the cam shaft rod 205, said fitting having a valve seat 206 closed by pressure of coil spring 207 against a valve seat 208. The outlet pipe 209 from valve 206 is secured thereto by an appropriate union fitting 210 and delivers as at 211 to the universal joint 212 which is encased within housing 213 in the same manner as in Figs. 7 and 8 previously described.

In the present embodiment, the universal joint is illustratively shown of construction differing from that of Figs. 7 and 8. The cam stub shaft 214 is provided with integral arms 215 fitting into a corresponding groove 216 in an approximately globular trunnion block 217, the cam shaft 218 having a similar pair of jaws 219 extending in a plane at right angles to jaws 215 and similarly fitting into corresponding grooves 220 in the trunnion block. The trunnion block has transverse oil ducts 221 therethrough, to pass the lubricant to the bearings thereof with respect to the clevis jaws. The pipe 209 is preferably supported only at the valve fitting end thereof and extending substantially freely with small clearance through a corresponding bore 222 at the knuckle end of the cam shaft and protrudes freely into a corresponding cavity 223 in the trunnion block 217, formed sufficiently wide to accommodate the displacement of said block in operation. It will be seen that as lubricant escapes past the drip plug 224, it is forced upward through duct 225 in rod 205, since it cannot readily escape through the relatively tight joint of the ball 226 in its socket. The pressure transmitted through the incompressible column of lubricant in the upward extending duct 225 overcomes the resistance of spring 207 to open the valve 206 and is thence continued upward through pipe 209 to lubricate the universal joint 212, the excess passing from the cavity 223 to the bottom of the universal joint housing, whence it is delivered to the various knuckle bearings in the manner shown in Figs. 7 and 8 and previously described. In this embodiment, I have not shown the lubrication of the cam stud shaft or of the cam, it being understood, of course, that this may be here provided in the same manner as in Figs. 7 and 8. If desired, the lubricant for the knuckle bearings may, in this embodiment, be tapped from the very bottom of the universal joint housing, since the universal joint is lubricated directly through the inlet conduit 209, as already described. It may be preferred, however, to tap the lubricant for the king pin, tie rod and steering arm bearings, in the manner shown in Fig. 8, in which case, of course, the universal joint would also receive splash lubrication.

In Figs. 12 and 13 is shown an alternative embodiment of universal joint for the knuckle end of the brake operating rock-shaft. In this embodiment, the clevis 232 rigid with the cam shaft stub 233 straddles a universal hub 234, which is mounted therein by the pivot ends 235 of screws 236 through said clevis. The clevis end 237 of the cam shaft 238 is similarly connected to the universal hub by the pivot ends of a pair of screws 239 through the latter clevis. The universal hub has a bore 240 therein providing sufficient clearance for the oil inlet pipe 241 to accommodate the relative movement of the hub in operation of the universal. The various types of universal joints described can, of course, be interchangeably used whether the brake operating shaft slopes downward from the chassis as in Figs. 7 and 8, or upward as in Fig. 9.

In the embodiments of Figs. 14 to 19, there is a simple hinging connection at the outlet end of a bridging conduit, which accommodates only the bodily displacement of the axle and knuckle relative to the chassis, a gravity flow passage within the knuckle clevis, but out of contact with the king pin, draining the lubricant from the hinge to the knuckle, in all positions of steering adjustment of the latter.

Referring more particularly to Figs. 14 to 17, the general details of the diagrammatic view of Fig. 14 may be the same as those in Figs. 1 or 4, the helical pipe 376 being supported by a fitting 443 on the channel frame C and communicating with a transverse pipe 377 supported from the helical pipe by fitting 444. In this embodiment I have shown the helix 376 under compression to resist bouncing of the chassis end of conduit 377, while the vehicle is in operation. The specific construction includes a rod 440 encircled by helix 376, and shorter than the unstressed axial length of the helix, said rod having ball ends 441 rigid therewith, the latter within corresponding ball sockets 442, in the fittings 443 and 444, constituting universal joints to accommodate the flexure of the helix. The construction just described may be used to advantage in the embodiment shown in Fig. 1.

Transverse pipe 377 has a straight-line drip plug 378 secured to the protruding end of a hinge pin 379 parallel to the channel frame and free to rock within a hinge socket 380 rigid with the axle. The knuckle has a clevis 381 that straddles the end of the axle 382, the king pin 383 being rigid with the axle and bearing in bushings 384 in the knuckle clevis. The hinge socket 380 is mounted on top of the king pin and is attached thereto by a screw 385, a pin 386 rigid with the socket extending downward therefrom into a slot 387 in the king pin, so that the fitting as a whole will be held against rotation about the screw 385.

The hinge pin 379 has an integral flange 388 against the inlet end of the hinge socket 380, the opposite end of said pin being upset as at 390 against a washer 390' which encircles the opposite end of the pin 379, washer 390' coacting with face 389 to hold the pin against longitudinal displacement in its socket. A cap 391 at the inlet end of the hinge pin is telescoped over the flange 388 and over the reduced end 392 of the socket and a screw cap 393 closes the opposite end of said socket. The hinge pin has a longitudinal bore 394 through which lubricant from the pipe 377 is delivered to a peripheral groove 395, from which all but the relatively small portion that will pass about the hinge pin to lubricate the bearing surface thereof is drained through an oblique duct 396 in the hinge socket for delivery to the bearings.

Preferably a metal baffle plate 397 is interposed between the top of the king pin and the hinge socket and clamped in place by the screw 385, said baffle having an oblique rim 398 extending downward with clearance over the beveled end 399 of the upper king pin bushing 384, and serving to deflect lubricant from duct 396 to the outer peripheray of the bushing 384. The bushing has one or more oblique apertures 400 communicating from the bevel 399 thereof to the upper bearing surface of the king pin 383. The king pin has a peripheral groove 401 near the bottom of the upper bearing in which lubricant admitted thereto through duct 400 will collect and from which it is drained through a radial bore 402' and a longitudinal bore 402 to lubricate the lower king pin bearing (not shown) in manner apparent from embodiments previously described. The bushing 384 has a longitudinal groove 403 connecting with a peripheral groove 404 about the bushing in which lubricant will collect to supply the tie rod bearing in the case of the righthand knuckle, or both the tie rod and steering arm bearings, in the case of the lefthand knuckle. As best shown in Fig. 16, a pair of similar outlet fittings 405 and 406 for use in the latter case, are threaded at diametrically opposite points through the knuckle clevis 381 to communicate with the peripheral groove 404, pipes 407 and 408 extending therefrom along the knuckle to the respective bearings.

The lower ends of the hinge socket is cylindrical and has telescoped thereover a sheet metal dust cap 409, the flange 410 of which telescopes over the upper end of the knuckle, the clearance being sufficient to allow free swiveling of the knuckle without wear on said dust cap.

In Figs. 18 and 19 is shown an alternative embodiment, the king pin 411 of which is pinned to the knuckle and rotates therewith in bearing bushings 412 in the axle clevis 418. In the usual manner, the upper thrust washer 413 is keyed as at 414 with respect to the bushing 412 and the lower thrust washer 415 is pinned as at 416 with respect to the knuckle, so that the wear in the steering operation will take place between the washer surfaces.

In this embodiment, in order to provide a simple hinging connection for a transverse conduit similar to that shown in Fig. 14, the hinge socket 417 rests directly upon the top of the knuckle clevis 418 to which it is secured as by screws 419. The hinge socket has a lug 420 protruding downward into the clevis bore, leaving small clearance with respect to the top of the king pin 411, and the upper beveled edge 421 of the upper bushing 412. The hinge pin 422 may be identical with that shown in Figs. 15 to 17, and drains through an oblique duct 423 in the hinge socket to the outer periphery of the bushing 412 along which it drains through longitudinal groove 424 and through apertures 425 and 426 in the upper and lower thrust washers 413 and 415 respectively, into a longitudinal duct 427 in the knuckle. The aperture 426 in the lower or knuckle thrust bearing is an arcuate slot which will communicate between aperture 425 and duct 427 in all positions of the knuckle. Duct 427 communicates with a socket 428 in the knuckle into which a dividing fitting 429 is screwed. The latter has nipples 430 and 431, one connected by a conduit 432 to the tie rod bearing (not shown) and the other by conduit 433 to the steering arm bearing (not shown). The common plane of the arms of the dividing fitting may be approximately at right angles to the vehicle axle, as shown. Pins 434 in the nipples serve to dam the flow, so as to assure correct division of lubricant between the two bearings. A radial aperture 435 through the bushing passes lubricant from the duct 424 to the upper bearing of the king pin, some of which will collect in a peripheral groove 436 about the king pin and by way of radial hole 438 to and through axial bore 437 to lubricate the lower king pin bearing.

In both embodiments of Figs. 14 to 19, it will be seen that the bodily displacement of the axle and knuckle relative to the chassis is accommodated by a simple hinge above the king pin and parallel to the channel frame, and the lubricant is conveyed to the knuckle by gravity flow through a path laterally of the king pin and within the upper king pin clevis.

It will, of course, be understood that although the supply conduit shown, bridging from the chassis to the knuckle, has a desirable application in combination with the lubricant distributing arrangements of Figs. 14 to 19, said distributing arrangement may be employed with any type of lubricant supply appliance.

The expression control bearings utilized in the accompanying claims includes the various bearings carried by, associated with or supported adjacent to a knuckle structure, namely, the pivotal bearings usually two in number consisting of the upper and lower king pin bearings, the thrust bearing which may also be considered a pivotal bearing, the tie rod and drag link bearings and the brake actuating bearings. The lubricant installations of the present invention are directed to lubricating any combination of one or more of these various bearings.

It will be understood, of course, that each of the various embodiments shown, may be equipped with means for supplying oil to the wheel spindle substantially in the manner shown in the embodiments of Figs. 1 and 5.

The specific claims of this application are directed to the embodiment of the invention shown in Figs. 1 to 6 inclusive. Divisional application Serial No. 283,426, filed June 6, 1928, embraces the subject matter illustrated in Figs. 7 to 13 of this application but not specifically claimed herein and divisional application, Serial No. 369,408 filed June 8, 1929, embraces the subject matter shown in Figs. 14 to 19 but not specifically claimed herein.

The various oil conveying arrangements and distributing joint constructions disclosed in the present application are broadly applicable to various types of lubricating installations and it is to be understood that it is also intended to include such application within the scope of the present application.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:—

1. In a front wheel construction of the type including a knuckle having an integral spindle, a road wheel journaled thereon, and a cap for the hub of said wheel enclosing the end of the spindle; the combination therewith of means for supplying lubricating oil for said spindle, said means comprising a longitudinal duct through said spindle, and an inlet near the base of said spindle for supplying lubricant to said duct.

2. In a motor vehicle structure of the type including an axle and a knuckle having a pivot mount thereat; the combination therewith of a self-sustaining lubricant transmitting tube bridging from said structure to a part of said knuckle, and including a joint adjacent said pivot mount and accommodating the steering movements of the knuckle.

3. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending from the third structure to the supporting structure supplied from the source and for substantially all of its length removed from the intermediate structure and supports for the respective ends of said conduit permitting turning movements between said respective ends of the conduit and the supporting and third structures to which they are respectively attached.

4. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending directly to said supporting structure from said third structure supplied from the source and altogether independent of the intermediate structure and supports for the respective ends of said conduit upon the supporting and third structures.

5. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending from the third structure to the supporting structure for substantially all of its length removed from the intermediate structure and supplied from said source and supports for the ends of said conduit permitting relative turning movements between the conduit and the supporting structure at supporting structure end and relative longitudinal movements between the conduit and the third structure at the third structure end.

6. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending from the third structure to the supporting structure supplied from said source for substantially its entire length independent of the intermediate structure and flow metering restriction means in flow intercepting relationship with said conduit positioned adjacent its outlet end.

7. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending from the third structure to the supporting structure supplied from said source, a support permitting relative turning movements between the conduit and the supporting structure for said conduit at the supporting structure end and flow metering restriction means associated with the support.

8. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending from the third structure to the supporting structure supplied from said source and a universal support for said conduit at the supporting structure end thereof permitting relative turning movements between the conduit and the supporting structure in both horizontal and vertical planes.

9. In a combination of a supporting structure with bearing surfaces, an intermediate structure pivotally connected thereto and a third structure resiliently connected to said intermediate structure; a lubricating installation for supplying lubricant to bearing surfaces of the supporting structure comprising a lubricant source on the third structure, a rigid conduit extending from the third structure to the supporting structure supplied from said source and a support for said conduit at the supporting structure end thereof permitting relative turning movement between the conduit and the supporting structure in a plane through the pivotal mount of the intermediate structure upon the supporting structure.

10. In a motor vehicle of the type including an axle, a knuckle and a king pin forming a pivotal mount between said axle and said knuckle; the combination therewith of a lubricating installation comprising a distributing receiver rigid with the knuckle and above the king pin, means to supply lubricant to said receiver and means to distribute lubricant from said receiver proportionately to bearing surfaces associated with the knuckle.

11. In a motor vehicle of the type including an axle, a knuckle and a king pin forming a pivotal mount between said axle and said knuckle; the combination therewith of a lubricating installation comprising a distributing receiver rigid with the knuckle and above the king pin, internal passageways from said receiver to the pivotal bearing surfaces of the knuckle and external passageways along the outside of the knuckle to other bearing surfaces upon the knuckle, means to supply lubricant to said receiver and means to proportion the lubricant flowing from said receiver to said internal and external passageways.

12. In a motor vehicle of the type including an axle, a knuckle, a king pin fixed to one of said elements and a clevis fixed to the other of said elements, the jaws of which encircle and bear upon the upper and lower ends of the king pin; the combination therewith of a distributing receiver above the king pin and in draining communication with the upper king pin bearing, a collector below the upper king pin bearing designed to receive lubricant which has passed therethrough and a passageway along the king pin structure receiving lubricant from said collector and supplying it to the lower king pin bearing.

13. In a vehicle of the type comprising an axle, a steering knuckle having a clevis straddling said axle, and a king pin rigid with said axle and constituting a pivot mount for said knuckle; the combination therewith of a distributing fitting secured to the upper end of said knuckle clevis directly above the king pin to move as a unit with the knuckle, said fitting having a ball socket therein for forming a ball and socket joint with a ball outlet supplied from the chassis.

14. In a motor vehicle, in combination, a front wheel knuckle, a king pin serving as a pivot connection therefor; the combination therewith of a conduit for supplying lubricant to the bearings of said knuckle from a point on the corresponding channel frame, said conduit including a flexible portion depending from the channel frame and a portion bridging transversely from said flexible portion to the knuckle, and means coaxial of said flexible conduit member and connected between the channel frame and the bridging conduit portion and affording sufficient axial stiffness to prevent bouncing of the conduit in operation of the vehicle and having sufficient lateral yield to permit the desired flexure of the conduit.

15. In a motor vehicle of the type comprising a frame, a front wheel knuckle pivotally mounted, a plurality of wheel control appurtenances carried by said knuckle and having bearings; the combination therewith of lubricating means for said bearings, said means comprising a conduit supported at one end substantially at the frame having a rocking mount at its other end substantially at the pivot axis of the knuckle, and self-sustaining therebetween in a substantially non-sagging crosswise bridging line, said conduit being constructed and arranged to accommodate the relative displacement between the supported ends thereof in vehicle operation, and conduits connected to convey lubricant from the knuckle end of said bridging conduit to said bearings, the bridging conduit having a universal joint mount at the knuckle end and the conduits leading to the bearings being substantially rigid with the knuckle and supplied from adjacent said universal joint.

16. In a vehicle of the type comprising an axle, a steering knuckle and a king pin, a pivot mount therefor on said axle; the combination therewith of a distributing fitting rigid with said knuckle and immediately above the king pin, and a transverse self-sustaining lubricant supply conduit bridging from the contiguous channel frame to said distributing fitting and having an outlet member supported upon and coacting with said fitting, to permit free relative movement of the latter with the knuckle in steering, the distributing fitting having outlets communicating with bearings on said knuckle, and flow control means for governing the distribution of the lubricant to said bearings.

17. In a motor vehicle of the type including an axle, a knuckle and a king pin forming a pivotal mount between said axle and said knuckle; the combination therewith of a lubricating installation comprising a distributing receiver rigid with the knuckle and above the king pin, means to supply lubricant to said receiver and means to distribute lubricant from said receiver proportionately to bearing surfaces associated with the knuckles, a plurality of outlet passages being associated with the distributing receiver and said passages being provided with restrictions to distribute the lubricant.

18. In a motor vehicle of the type including an axle, a knuckle, a king pin fixed to one of said elements and a clevis with upper and lower jaws fixed to the other of said elements, the jaws of which encircle and bear upon the upper and lower ends of the king pin; the combination therewith of a receiver above the king pin and in draining communication with the upper king pin bearing, peripheral grooves on the king pin respectively at said upper and lower bearings and a flat along the king pin located between said grooves and serving to drain lubricant from said upper king pin bearing to said lower king pin bearing.

19. In combination, a machine having relatively moving structures one of which carries a source of lubricant and the other of which carries bearings to be lubricated and a conduit system extending from said source to said bearings feeding lubricant to said bearings from said source, said conduit system including an elongated tube extending between said structures and connecting means at the ends of said tube attached to said respective structures and taking up relative movements between the ends of the tube and the respective structures, the connecting means at the outlet end of said tube including a single inlet in lubricant communication with said tube, a plurality of outlets connected to conduits of said system, and means to meter the flow of lubricant through said outlets.

20. In combination, a machine having relatively moving structures one of which carries a source of lubricant and the other of which carries bearings to be lubricated and a conduit system extending from said source to said bearings feeding lubricant to said bearings from said source, said conduit system including an elongated tube extending between said structures and connecting means at the ends of said tube attached to said respective structures and taking up relative movements between the ends of the tube and the respective structures, the connecting means at the outlet end of said tube including inlet and outlet means and means at the inlet to reduce the pressure of the lubricant before passage through the connecting means.

21. In combination, a machine having relatively moving structures, one of which carries a source of lubricant and the other of which carries bearings to be lubricated and a conduit system extending from said source to said bearings feeding lubricant to said bearings from said source, said conduit system including an elongated tube extending between said structures and connecting means at the ends of said tube attached to said respective structures and taking up relative movements between the ends of the tube and the respective structures, the connecting means at the outlet end of said tube including inlet and outlet means and restrictions at said inlet and outlet means to control the flow of lubricant therethrough.

Signed at New York, in the county of New York, and State of New York, this 31st day of October, A. D. 1923.

JOSEPH BIJUR.